(12) United States Patent
Xiong

(10) Patent No.: US 11,465,880 B2
(45) Date of Patent: Oct. 11, 2022

(54) ELEVATOR MAINTENANCE SPACE PROJECTION SYSTEMS

(71) Applicant: Otis Elevator Company, Farmington, CT (US)

(72) Inventor: Bi Xiong, Châtillon-sur-Loire (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 1140 days.

(21) Appl. No.: 16/022,773

(22) Filed: Jun. 29, 2018

(65) Prior Publication Data

US 2019/0002240 A1    Jan. 3, 2019

(30) Foreign Application Priority Data

Jul. 3, 2017 (EP) ..................... 17305854

(51) Int. Cl.
| | |
|---|---|
| *B66B 5/00* | (2006.01) |
| *B66B 9/00* | (2006.01) |
| *H04N 5/66* | (2006.01) |
| *B66B 11/02* | (2006.01) |
| *B66B 3/00* | (2006.01) |

(52) U.S. Cl.
CPC ............ *B66B 5/0087* (2013.01); *B66B 3/002* (2013.01); *B66B 5/005* (2013.01); *B66B 9/00* (2013.01); *B66B 11/0226* (2013.01); *H04N 5/66* (2013.01)

(58) Field of Classification Search
CPC ....... B66B 5/0087; B66B 3/002; B66B 5/005; B66B 9/00; B66B 11/0226; H04N 5/66
See application file for complete search history.

(56) References Cited

U.S. PATENT DOCUMENTS

| | | | | |
|---|---|---|---|---|
| 4,577,177 A | * | 3/1986 | Marubashi | G09G 3/001 340/815.42 |
| 6,161,654 A | * | 12/2000 | Sirigu | B66B 3/008 187/391 |
| 6,202,797 B1 | * | 3/2001 | Skolnick | B66B 5/005 187/391 |
| 7,338,176 B2 | * | 3/2008 | Svensson-Hilford | B66B 13/24 353/78 |
| 7,523,809 B2 | * | 4/2009 | Monzon-Simon | B66B 5/0062 187/314 |
| 7,954,606 B2 | * | 6/2011 | Tinone | B66B 5/005 187/391 |

(Continued)

FOREIGN PATENT DOCUMENTS

| | | |
|---|---|---|
| CN | 1541180 A | 10/2004 |
| CN | 101077749 A | 11/2007 |

(Continued)

OTHER PUBLICATIONS

European Search Report, European Application No. 17305854.6, dated Jan. 25, 2018, European Patent Office; European Search Report 5 pages.

*Primary Examiner* — Michael A Riegelman
(74) *Attorney, Agent, or Firm* — Cantor Colburn LLP

(57) ABSTRACT

Elevator maintenance space projection systems and elevator systems including a projector located within an elevator shaft and arranged to project a display space within the elevator shaft such that the display space includes one or more projected images identifying at least one of a safety volume, a refuge space, and a maintenance location.

20 Claims, 4 Drawing Sheets

(56) References Cited

U.S. PATENT DOCUMENTS

| | | | | |
|---|---|---|---|---|
| 8,061,486 B2* | 11/2011 | Monzon | ............... | B66B 5/005 |
| | | | | 340/541 |
| 8,556,043 B2* | 10/2013 | Mangini | ............... | B66B 5/0043 |
| | | | | 187/392 |
| 9,327,953 B2* | 5/2016 | Sayles | ............... | B66F 11/04 |
| 2010/0315603 A1* | 12/2010 | Jeng | ............... | G03B 21/28 |
| | | | | 353/82 |
| 2018/0141779 A1* | 5/2018 | Fauconnet | ............... | B66B 1/465 |
| 2019/0002240 A1* | 1/2019 | Xiong | ............... | B66B 5/0087 |
| 2019/0352134 A1* | 11/2019 | Tscuppert | ............... | B66B 19/007 |

FOREIGN PATENT DOCUMENTS

| | | |
|---|---|---|
| CN | 101628676 | 6/2013 |
| EP | 1167268 | 1/2002 |
| EP | 1431228 A2 | 6/2004 |
| EP | 2080725 | 7/2009 |
| EP | 3135620 | 3/2017 |
| JP | 08113440 | 5/1996 |
| JP | 2005096891 | 4/2005 |
| JP | 2010195530 A | 9/2010 |
| JP | 2010208814 A | 9/2010 |
| JP | 3176548 | 6/2012 |
| JP | 2013180856 A | 9/2013 |
| JP | 2015081193 A | 4/2015 |
| JP | 5743346 | 7/2015 |
| KR | 101405169 | 6/2014 |
| WO | 2017008849 | 1/2017 |

\* cited by examiner

ELEVATOR MAINTENANCE SPACE PROJECTION SYSTEMS

CROSS REFERENCE TO RELATED APPLICATIONS

This application claims the benefit of European Application No. 17305854.6, filed Jul. 3, 2017, which is incorporated herein by reference in its entirety.

BACKGROUND

The subject matter disclosed herein generally relates to elevator systems and, more particularly, elevator maintenance space indication systems.

Elevator systems are installed with spaces located above and below an elevator car at the top and bottom of an elevator shaft, respectively. Such spaces are generally referred to as "safety volumes" and are designed to provide space for a mechanic or other person to enter the safety volume to perform maintenance or take other action. The safety volume at the top of an elevator shaft is typically accessed from on top of the elevator car and the safety volume at the bottom of an elevator shaft is typically accessed by use of a ladder and entering a pit of the elevator shaft. Within the safety volume, there may be one or more refuge spaces that are subspaces of the safety volume that are designated for additional safety.

Typically, such safety volumes and refuge spaces are designated and indicated by use of a panel or sign that is mounted on the elevator car, on the elevator shaft wall(s), or located within the pit of the elevator shaft. The sign may include a drawing or layout of the refuge space(s) within the safety volume. Such signs can be positioned and arranged to be readable from an entrance to the elevator shaft, and further shall clearly indicate the allowed number of persons and the type of posture(s) or stance(s) allowed for the specific refuge spaces(s). However, once a mechanic is located in the pit or on a top of an elevator car, it may be hard to be sure of the exact location of the position of the refuge space. Accordingly, it may be advantageous to provide improved safety volume and/or refuge space indications.

SUMMARY

According to some embodiments, elevator maintenance space projection systems are provided. The elevator maintenance space projection systems include a projector located within an elevator shaft and arranged to project a display space within the elevator shaft such that the display space includes one or more projected images identifying at least one of a safety volume, a refuge space, and a maintenance location.

In addition to one or more of the features described herein, or as an alternative, further embodiments of the elevator maintenance space projection systems may include that the display space includes a plurality of projected images.

In addition to one or more of the features described herein, or as an alternative, further embodiments of the elevator maintenance space projection systems may include that at least one projected image includes indicator information indicating a purpose of the respective projected image.

In addition to one or more of the features described herein, or as an alternative, further embodiments of the elevator maintenance space projection systems may include that at least one projected image is color coded to indicate a purpose of the respective projected image.

In addition to one or more of the features described herein, or as an alternative, further embodiments of the elevator maintenance space projection systems may include that at least one projected image is a three-dimensional projection within the display space.

In addition to one or more of the features described herein, or as an alternative, further embodiments of the elevator maintenance space projection systems may include that at least one projected image is a two-dimensional projection within the display space.

In addition to one or more of the features described herein, or as an alternative, further embodiments of the elevator maintenance space projection systems may include that the one or more projected images define boundaries of an area or volume of the safety volume, refuge space, or maintenance location.

In addition to one or more of the features described herein, or as an alternative, further embodiments may include elevator systems having an elevator shaft and an elevator car movable within the elevator shaft and the elevator system includes the elevator maintenance space projection systems of any of the embodiments described herein.

In addition to one or more of the features described herein, or as an alternative, further embodiments of the elevator systems may include that the elevator maintenance space projection system is located in a pit of the elevator system.

In addition to one or more of the features described herein, or as an alternative, further embodiments of the elevator systems may include that the projector is mounted to a wall of the pit.

In addition to one or more of the features described herein, or as an alternative, further embodiments of the elevator systems may include a second elevator maintenance space projection system located on a top of the elevator car.

In addition to one or more of the features described herein, or as an alternative, further embodiments of the elevator systems may include that the elevator maintenance space projection system is located on a top of the elevator car.

In addition to one or more of the features described herein, or as an alternative, further embodiments of the elevator systems may include that the projector is mounted to a portion of the elevator car.

In addition to one or more of the features described herein, or as an alternative, further embodiments of the elevator systems may include that the elevator car includes a safety rail located on the top thereof, wherein the projector is mounted on the safety rail.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
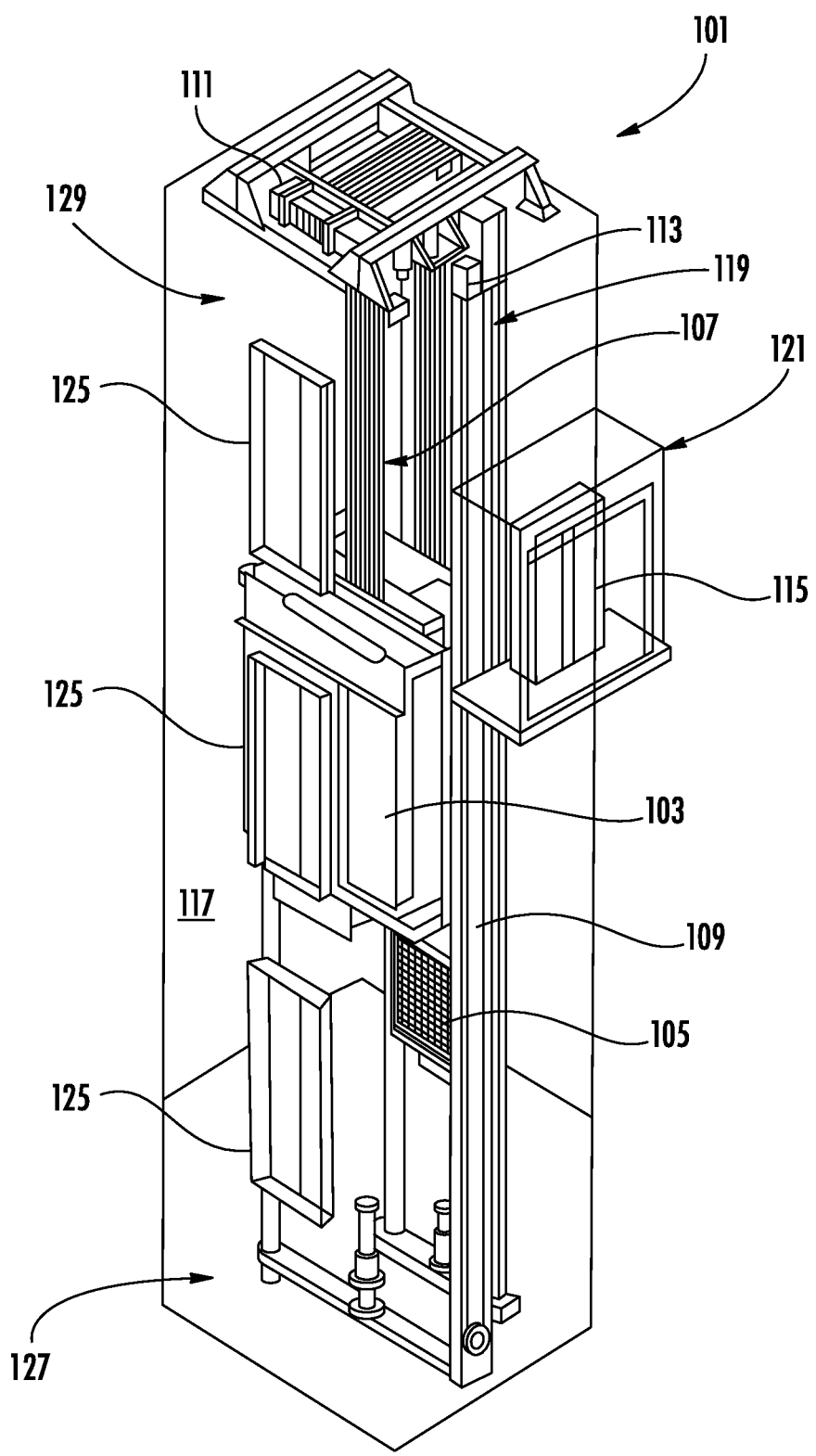
FIG. 1 is a schematic illustration of an elevator system that may employ various embodiments of the present disclosure.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes.

As discussed above, elevator systems are installed with spaces located above and below an elevator car at the top and bottom of an elevator shaft, respectively. As shown in FIG. 1, the elevator shaft 117 includes a pit 127 and a shaft top 129. The pit 127 and the shaft top 129 are arranged to include safety volumes that are designed to provide space for a mechanic or other person to enter the safety volume to perform maintenance or take other action. The safety volume at the shaft top 129 of the elevator shaft 117 is typically accessed from on top of the elevator car 103 and the safety volume in the pit 127 of the elevator shaft 117 is typically accessed by use of a ladder to enter the pit 127 of the elevator shaft 117. Within the safety volumes there are one or more refuge spaces that are subspaces of the respective safety volumes that are designated for additional safety.

Typically, such safety volume and refuge spaces are designated and indicated by use of a panel or sign that is mounted on the elevator car, on the elevator shaft wall(s), or located within the pit of the elevator shaft. The sign may include a drawing or layout of the refuge space(s) within the safety volume. Such signs can be positioned and arranged to be readable from an entrance to the elevator shaft, and further shall clearly indicate the allowed number of persons and the type of posture(s) or stance(s) allowed for the specific refuge spaces(s). However, once a mechanic is located in the safety volume, it may be difficult to determine the exact location of the position of the refuge space(s) within the safety volume. Further, there may be a risk that the illustration on the sign can be misinterpreted by the mechanic. Accordingly, embodiments provided herein are directed to improving safety by clearly indicating the safety volume and/or refuge space(s) physically and clearly during a duration of a maintenance operation.

Figure 2:
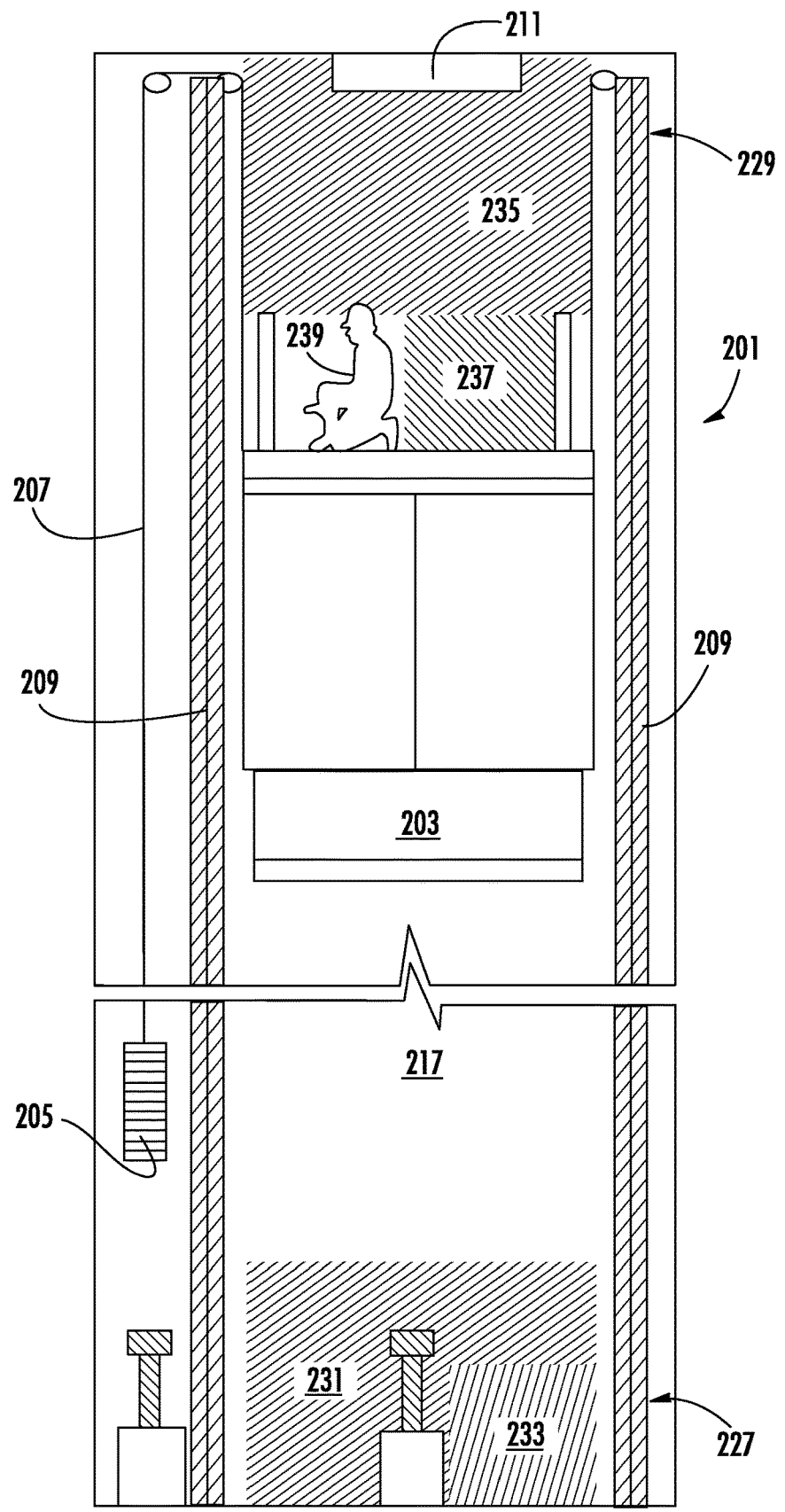
FIG. 2 is a schematic illustration of an elevator shaft of an elevator system that may incorporate embodiments of the present disclosure.

Turning now to FIG. 2, a schematic illustration of an elevator shaft 217 of an elevator system 201 is shown. The elevator shaft 217 has a pit 227 with a pit safety volume 231 having at least one pit refuge space 233. Similarly, a shaft top 229 includes a top safety volume 235 having at least one top refuge space 237. An elevator car 201 is moveable within the elevator shaft 217 along guide rails 209. The elevator system 201 is similar to that shown and described with respect to FIG. 1. Movement of the elevator car 203 is controlled by an elevator machine 211 located at the shaft top 229 of the elevator shaft 217, with the elevator machine 211 driving roping 207 from which the elevator car 203 and a counterweight 205 are suspended.

As shown in FIG. 2, the elevator car 203 is located at a maximum location within the elevator shaft 217 with a mechanic 239 located thereon. The mechanic 239 may require access to the elevator car top and/or the shaft top to perform maintenance on one or more components within the elevator shaft 217. Similarly, the mechanic 239 may require access to the pit 227 to perform maintenance on one or more components of the elevator system 201 that are located within the pit 227. The mechanic 239 can access the top of the elevator car 203 by opening landing doors and stepping on top of the elevator car 203 from a landing or through a hatch within the elevator car 203. The safety volumes 231, 235 and respective refuge spaces 233, 237 are used by the mechanic 239 to ensure safe maintenance operations within the elevator shaft 217.

To provide clear and unmistakable indication of the location of the safety volumes 231, 235 and/or the refuge spaces 233, 237, embodiments provided herein are directed to employing optical imaging and/or projection (e.g., laser projection) in addition to the typical panel sign. The projected image provides an outline (two-dimensional or three-dimensional) of a specific safety volume, refuge space, and/or maintenance location on an elevator car top or on the floor of the pit to physically indicate the location and, in some cases, the dimension(s), of the safety volume, refuge space, and/or maintenance location. The projected image can be presented and visible to a mechanic before and during the duration of a maintenance operation.

Figure 3:
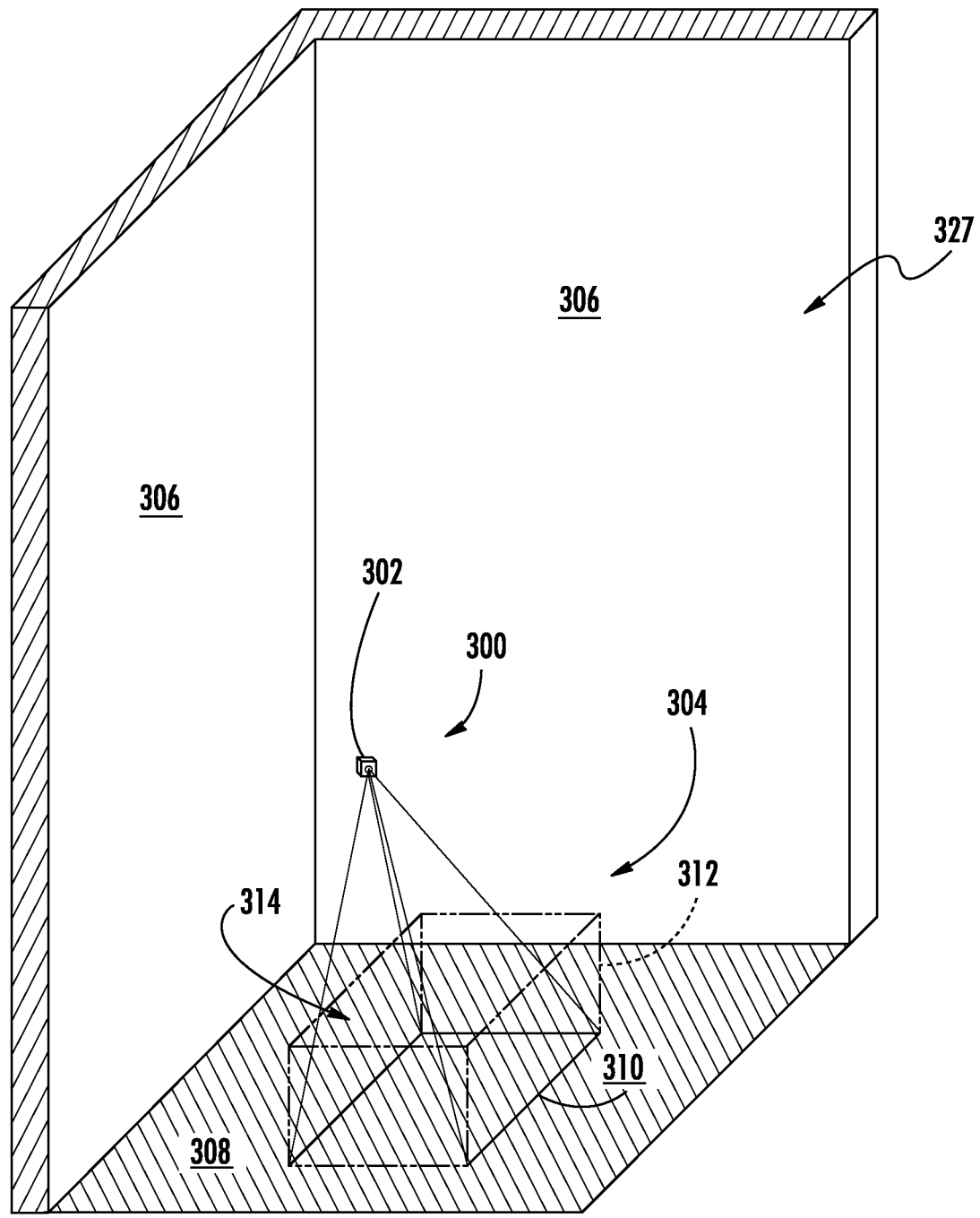
FIG. 3 is a schematic illustration of an elevator maintenance space projection system located in a pit of an elevator shaft and arranged in accordance with an embodiment of the present disclosure.

Turning now to FIG. 3, a schematic illustration of a pit 327 having a maintenance space projection system 300 in accordance with an embodiment of the present disclosure is shown. The pit 327 is schematically shown with various elements of an elevator system removed or not shown for simplicity, including various elements located within an elevator shaft (e.g., as shown in FIGS. 1-2). However, those of skill in the art will appreciate that the pit 327 can include components of elevator systems that may require maintenance, including, but not limited to, guide rails, counterweights, electronics, control elements, buffers, etc. As shown, the maintenance space projection system 300 includes a projector 302 that is arranged to project an image or light into a designated location or display space 304 on a pit floor 308 of an elevator shaft. The display space 304 includes a projected image 314 that indicates a predetermined location, area, or volume within the pit 327 that is representative of a safety volume, refuge space, and/or maintenance location.

The projector 302, as shown, is mounted to a pit wall 306 and the display space 304 is projected onto a pit floor 308. As shown, the display space 304, and particularly the projected image 314, has a projected base 310 and a projected height 312. That is, the projected image 314, as shown in FIG. 3, is a three-dimensional volume that can be visible to a mechanic within the pit 327. The projected base 310 can have predefined boundaries that indicate a floor space of the specific projected image 314, and may represent and indicate a safe location on the pit floor 308 for a mechanic to stand. Further, the projected height 312 may designate and/or indicate a maximum height a mechanic should stand or extend vertically when performing maintenance within the pit 327.

Figure 4:
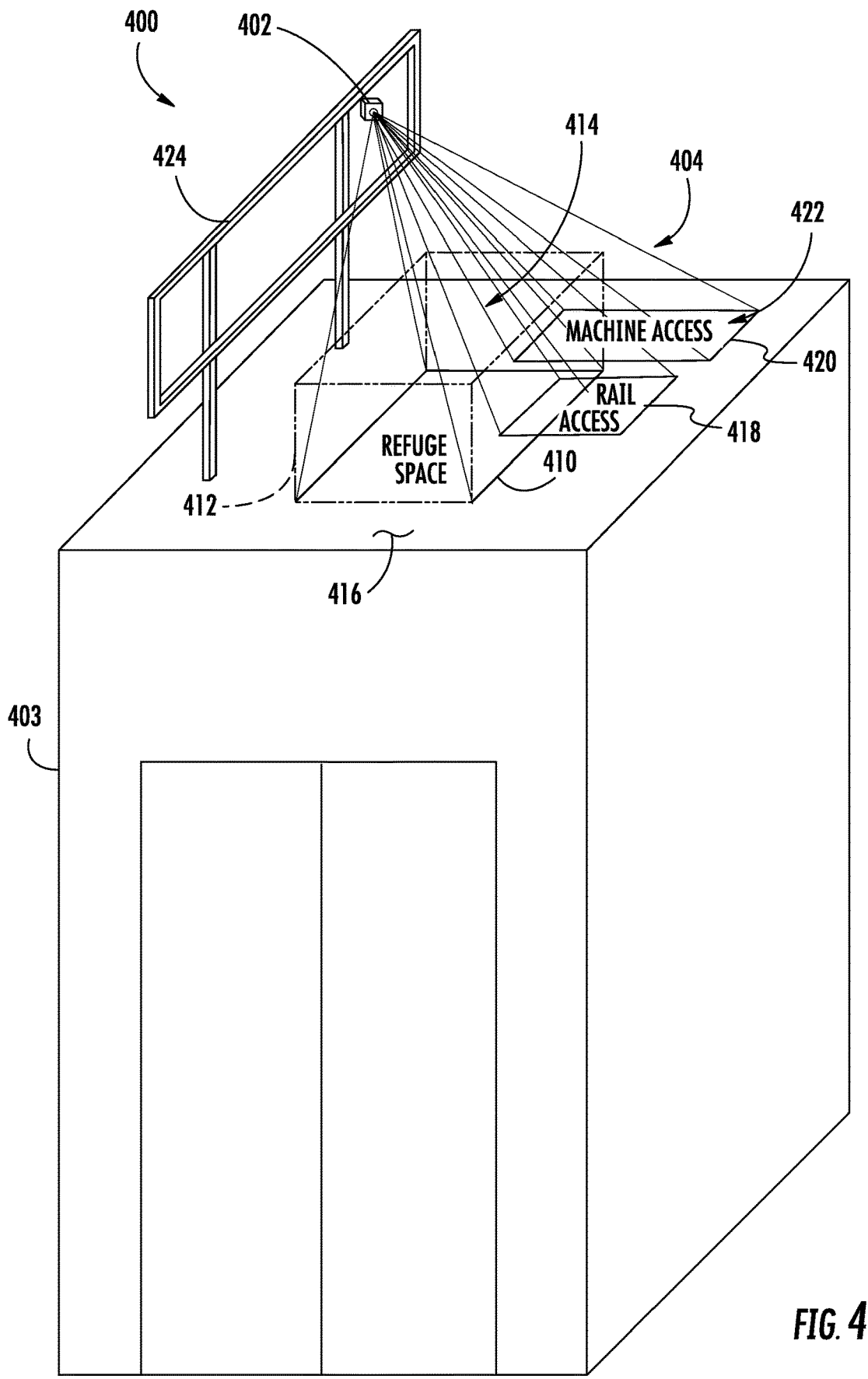
FIG. 4 is a schematic illustration of an elevator maintenance space projection system located on a top of an elevator car and arranged in accordance with an embodiment of the present disclosure.

Turning now to FIG. 4, a schematic illustration of an elevator car 403 having a maintenance space projection system 400 in accordance with an embodiment of the present disclosure is shown. The elevator car 403 is schematically shown with various elements of an elevator system removed or not shown for simplicity, including various elements located within an elevator shaft (e.g., as shown in FIGS. 1-2). However, those of skill in the art will appreciate that the elevator car 403 and the elevator shaft in which the elevator car is located can include components of elevator systems that may require maintenance, including, but not limited to, guide rails, counterweights, electronics, control elements, elevator machines, buffers, etc. As shown, the maintenance space projection system 400 includes a projector 402 that is arranged to project an image or light into a designated location or display space 404 on a top 416 of the elevator car 403. The display space 404, in this embodiment, includes a plurality of predetermined locations, areas, or volumes (projected images 414, 418, 420) on the top 416 of the elevator car 403. The display space 404 includes various indicators that are representative of safety volumes, refuge spaces, and/or maintenance locations.

The projector 402, as shown, is mounted to a safety rail 424 that is provided on the top 416 of the elevator car 403 to provide safety to a mechanic (e.g., boundary at an edge of the elevator car 403 and/or to provide a hand hold). Although shown in a specific mounting arrangement, other mounting and/or installation arrangements are possible without departing from the scope of the present disclosure. For example, dedicated installation elements (e.g., tripods, rails, poles, mounts, etc.) can be employed that support the projector.

The projected images 414, 418, 420 of the display space 404 are projected onto the top 416 of the elevator car 403. As shown, the display space 404 includes a first projected image 414, a second projected image 418, and a third projected image 420. The first projected image has a projected base 410 and a projected height 412 and forms a three-dimensional volume that is visible to a mechanic located on the top 416 of the elevator car 403. The projected base 410 of the first projected image 414 defines boundaries of a space on the top 416 of the elevator car 403 and represents or indicates a safe location on top 416 of the elevator car 403 for the mechanic to stand. Further, the projected height 412 designates and/or indicates a maximum height a mechanic should stand or extend vertically when performing maintenance while located on the top 416 of the elevator car 403. In this embodiment, the three-dimensional first projected image 414 represents a refuge space where a mechanic can move to if necessary to seek refuge from potential injury.

As illustrated, the second and third projected images 418, 420 are two-dimensional images that are projected onto the top 416 of the elevator car 403. The second and third projected images 418, 420 represent maintenance locations. For example, the second projected image 418 represents a location for access to and maintenance operations related to a guide rail and the third projected image 420 represents a location for access to and maintenance operations related to an elevator machine.

As shown, each of the projected images 414, 418, 420 includes indicator information 422, which can indicate the purpose or designation of the specific or particular projected image and the bounds define thereby. In this embodiment, the first projected image 414 includes indicator information stating "Refuge Space," the second projected image 418 includes indicator information stating "Rail Access," and the third projected image 420 includes indicator information stating "Machine Access." Those of skill in the art will appreciate that these are merely examples and the projected images can include any written text, characters, icons, or other image and/or information. Further, in some embodiments, the different projected images may have different colors, patterns, brightness, flashing, etc. (hereinafter projection characteristic) associated therewith that can be used to differentiate or distinguish the various projected images. A code or index of projection characteristics can be provided on a panel sign or other posted notice. Although FIG. 4 illustrates a single projector projecting a plurality of projected images, in some embodiments multiple projectors can be installed to generate or project that various projected images and/or multiple display spaces.

In accordance with embodiments of the present disclosure, maintenance space projection systems are provided to project spatial information (e.g., safety volume) as a light (e.g., hologram, two-dimensional image, etc.). A projector of the maintenance space projection systems can be installed at any location within an elevator shaft and positioned and oriented to project and display predetermined images (whether two- or three-dimensional). For example, as illustrated herein, when projecting onto the ceiling or top of an elevator car, the projector can be fixed on the upper parts of the elevator car, for example the top of the balustrade. In other arrangements, the projector may be mounted to an elevator shaft wall at the top of the elevator shaft, and arranged to project a display space into an area or volume on the top of an elevator car. In case of maintenance space projection systems located in the pit of an elevator shaft, the projector can be fixed on a wall or other fixed part of the elevator system.

As noted above, the projected images of the display space in accordance with some embodiments can provide physical identification continuously through a duration of a mechanic being located in a maintenance area (e.g., in the pit or located on top of an elevator car). In some embodiments, activation of a maintenance space projection system in accordance with embodiments of the present disclosure can be triggered by a mechanic switching the elevator system into a maintenance mode of operation.

Those of skill in the art will appreciate that various example embodiments are shown and described herein, each having certain features in the particular embodiments, but the present disclosure is not thus limited. That is, features of the various embodiments can be exchanged, altered, or otherwise combined in different combinations without departing from the scope of the present disclosure.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An elevator maintenance space projection system comprising:
   a projector located within an elevator shaft and arranged to project a display space within the elevator shaft, wherein the display space includes one or more projected images identifying at least one of a safety volume, a refuge space, and a maintenance location.

2. The elevator maintenance space projection system of claim 1, wherein the display space includes a plurality of projected images.

3. The elevator maintenance space projection system of claim 1, wherein at least one projected image includes indicator information indicating a purpose of the respective projected image.

4. The elevator maintenance space projection system of claim 1, wherein at least one projected image is color coded to indicate a purpose of the respective projected image.

5. The elevator maintenance space projection system of claim 1, wherein at least one projected image is a three-dimensional projection within the display space.

6. The elevator maintenance space projection system of claim 1, wherein at least one projected image is a two-dimensional projection within the display space.

7. The elevator maintenance space projection system of claim 1, wherein the one or more projected images define boundaries of an area or volume of the safety volume, refuge space, or maintenance location.

8. An elevator system comprising:
   an elevator shaft;
   an elevator car movable within the elevator shaft; and
   an elevator maintenance space projection system comprising;
   a projector located within the elevator shaft and arranged to project a display space within the elevator shaft, wherein the display space includes one or more projected images identifying at least one of a safety, volume, a refuge space, and a maintenance location.

9. The elevator system of claim 8, wherein the elevator maintenance space projection system is located in a pit of the elevator system.

10. The elevator system of claim 9, wherein the projector is mounted to a wall of the pit.

11. The elevator system of claim 9, further comprising a second elevator maintenance space projection system located on a top of the elevator car.

12. The elevator system of claim 8, wherein the elevator maintenance space projection system is located on a top of the elevator car.

13. The elevator system of claim 12, wherein the projector is mounted to a portion of the elevator car.

14. The elevator system of claim 13, wherein the elevator car includes a safety rail located on the top thereof, wherein the projector is mounted on the safety rail.

15. The elevator system of claim 8, wherein the display space includes a plurality of projected images.

16. The elevator system of claim 8, wherein at least one projected image includes indicator information indicating a purpose of the respective projected image.

17. The elevator system of claim 8, wherein at least one projected image is color coded to indicate a purpose of the respective projected image.

18. The elevator system of claim 8, wherein at least one projected image is a three-dimensional projection within the display space.

19. The elevator system of claim 8, wherein at least one projected image is a two-dimensional projection within the display space.

20. The elevator system of claim 8, wherein the one or more projected images define boundaries of an area or volume of the safety volume, refuge space, or maintenance location.

* * * * *